No. 801,224. PATENTED OCT. 10, 1905.
W. M. CUMMISKEY.
AUTOMATIC ELECTRIC MOTOR STARTER.
APPLICATION FILED JULY 20, 1904.

3 SHEETS—SHEET 1.

WITNESSES:

INVENTOR
W. M. Cummiskey
BY
Edward P. Thompson
ATTORNEY

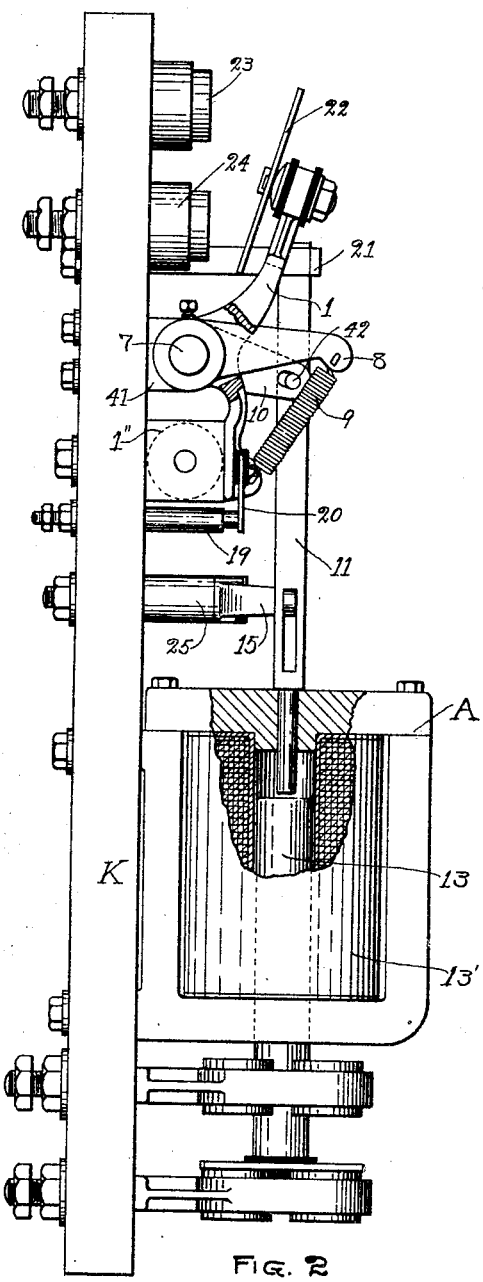
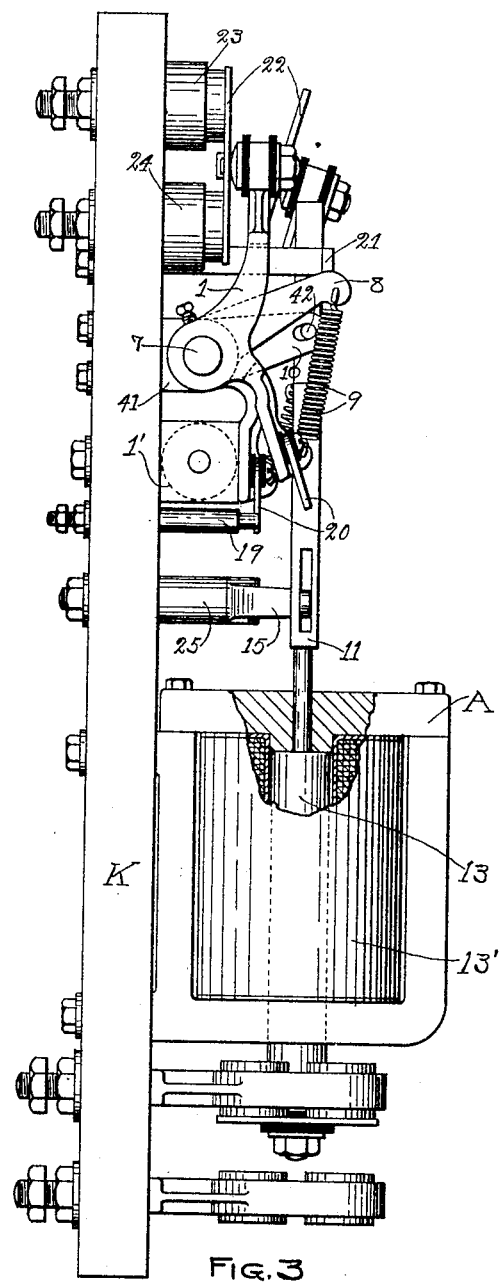

No. 801,224. PATENTED OCT. 10, 1905.
W. M. CUMMISKEY.
AUTOMATIC ELECTRIC MOTOR STARTER.
APPLICATION FILED JULY 20, 1904.

3 SHEETS—SHEET 3.

WITNESSES:
wa Kelly
M. A. Carroll

INVENTOR
W. M. Cummiskey
BY
Edward P. Rawson
ATTORNEY

UNITED STATES PATENT OFFICE.

WILLIAM MICHAEL CUMMISKEY, OF NEWARK, NEW JERSEY.

AUTOMATIC ELECTRIC-MOTOR STARTER.

No. 801,224.   Specification of Letters Patent.   Patented Oct. 10, 1905.

Application filed July 20, 1904. Serial No. 217,399.

*To all whom it may concern:*

Be it known that I, WILLIAM MICHAEL CUMMISKEY, a citizen of the United States of America, and a resident of Newark, in the county of Essex and State of New Jersey, have invented certain new and useful Improvements in Automatic Electric-Motor Starters, of which the following is a specification.

My invention relates to motor-starters in which the operating manual switch in an elevator is adapted to close circuits whose currents will automatically cut out the motor resistances gradually and independently of the speed of movement of the manual switch by the elevator operator. It is applicable to other purposes, too, besides starting elevators.

Without defining here the scope of novelty, which is attended to in the claims hereinafter annexed, the general nature of the invention comprises an electric motor, resistances in series circuit therewith, a manual switch, cut-outs for the resistances, magnets for holding the cut-outs open and whose current is controlled by said manual switch, means less powerful than the magnets tending to close the cut-outs, and electric devices for successively excluding said magnets.

More particularly, the general organization consists of an electric motor, resistances in series circuit therewith, a manual switch, cut-outs for the resistances, magnets for holding the cut-outs open and whose current is controlled by said manual switch, means less powerful than the magnets tending to close the cut-outs, electric devices for successively excluding said magnets, said cut-outs consisting of levers and said means consisting of arms, springs connecting said arms to said cut-outs, a shaft supporting said arms, apparatus for rocking said shaft, said apparatus consisting of a rod, an arm from the shaft pivoted to said rod, an electromagnetic device for controlling said rod, a dash-pot, a piston therein and connected up with the said electric devices which cut out said magnets for releasing the said resistance cut-outs, said piston being connected up with said rod to be released by the latter.

Figure 1:
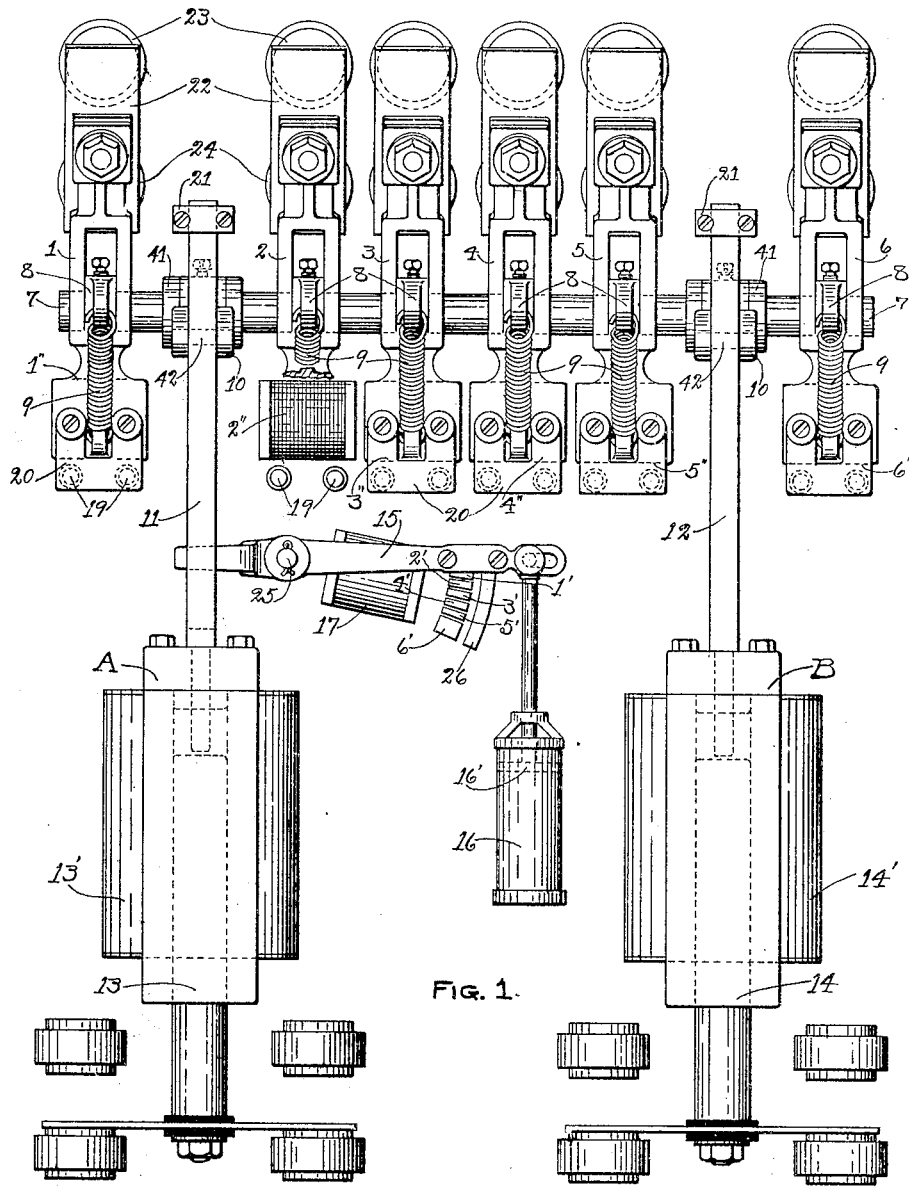
Figure 1A:
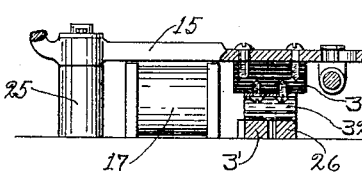
Figure 5:
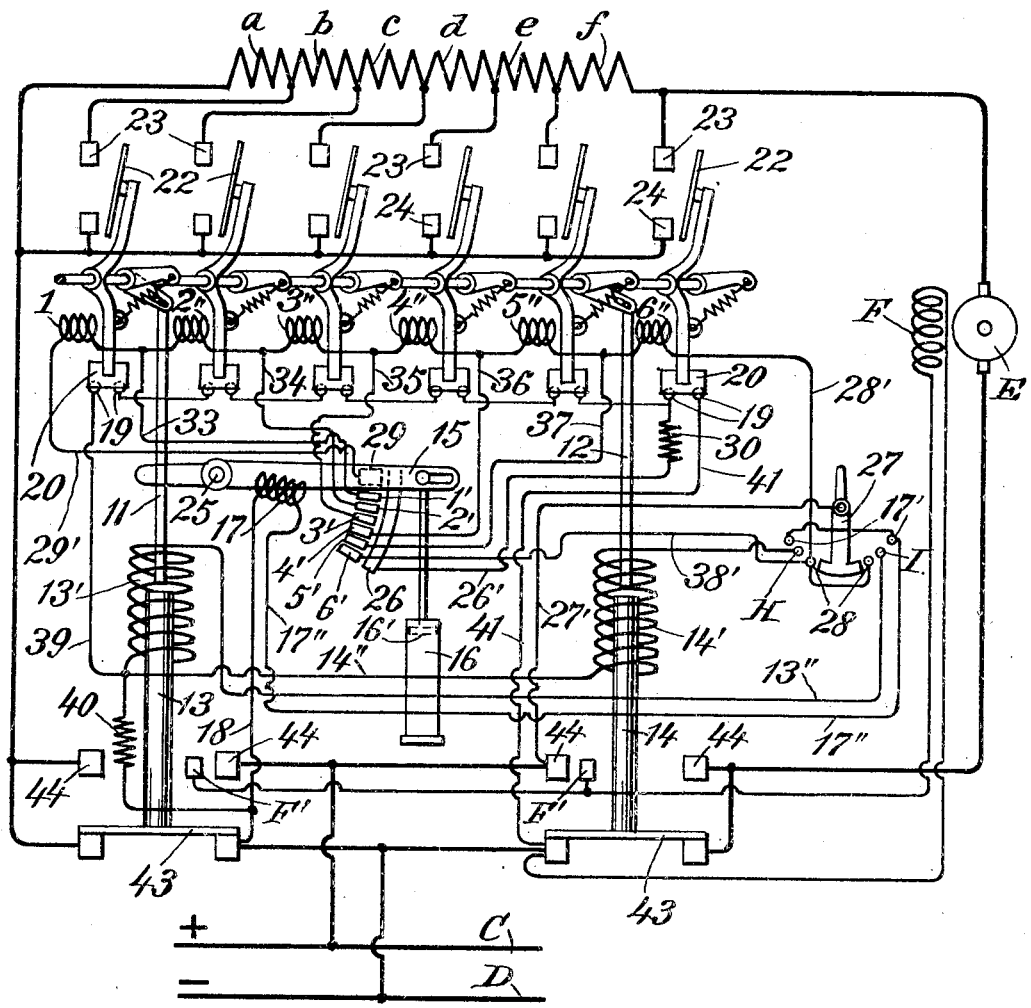
Figure 4:
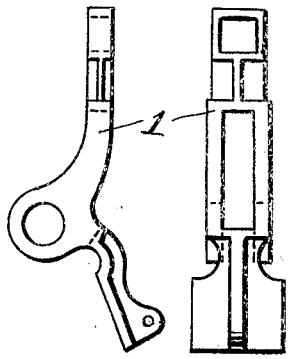

Figure 1 is a front elevation of the invention in the normal phase. Fig. 1ª is a detail, partly in section. Fig. 2 is a side elevation in the same phase. Fig. 3 is the same as Fig. 2, except that it shows one phase in the operation. Fig. 4 is a detail of a portion of the cut-out for the resistances. Fig. 5 is a diagram of the circuits with the advices shown mostly only in outline.

At 13 and 14 are the cores of the usual reversing-switches 43 and 43' used on this type of controller. Mounted above these on the same panel K is a device consisting of a shaft 7, supported by bearings 41, at which points are keyed to the shaft 7 levers 10, which extend out and engage pins 42 on rods 11 and 12, the latter being guided in magnets frames A and B, respectively, and bearings 21, Fig. 1. Mounted also on shaft 7 are iron levers loose 1, 2, 3, 4, 5, and 6, (shown in detail in Fig. 5,) carrying copper plates 22 above and 20 below, which are insulated from the levers. Keyed to shaft 7 are also levers 8, there being one for each lever 1 2 3, &c., the respective levers being connected by springs 9, as shown in Figs. 2 and 3. Mounted on the panel are small magnets 1'', 2'', 3'', 4'', 5'', and 6'', on which rest levers 1, 2, 3, 4, 5, and 6 when in inoperative positions touching the pole-pieces of said magnets. Directly below each magnet 1'' 2'' 3'', &c., are two electric contacts 19, which make contact with plates 20 when the levers 1 2 3, &c., are down, as shown in Fig. 2.

As shown in Figs. 2 and 3, rod 11 has a slot through which extends one end of lever 15, which is pivoted on the stud 25, and the other end extends opposite the magnet 17, which attracts and holds it when its coil is energized. On its extreme end the lever 15 is connected with the piston 16' of a dash-pot 16.

Mounted on the panel K between the magnet 17 and the dash-pot 16 are contacts 1', 2', 3', 4', 5', and 6' and segment 26, which are swept by a brush 32, secured to and insulated from the lever 15 by a block 31, Fig. 4, as will be readily seen, when the piston of the dash-pot falls, bringing with it the lever 15. The brush 32 makes connection successively between contacts 1', 2', 3', 4', 5', and 6', on the one hand, and segment 26, on the other hand, permanently. Mounted also on the panel are pairs of contacts 23 and 24, which are connected by cut-out plates 22 when the levers 1 2 3, &c., are raised. The function of this device as a whole as here applied is to successively short-circuit the starting resistances placed in series with the armature of the motor, whose armature is E and field-magnet F.

The operation at starting is as follows: Referring to Fig. 5, it is seen that the lever of the hand-switch 27 is connected directly to one side C of the supply-line C D. Therefore when it is thrown in either direction it first touches either contact 28, which establishes the following circuit from 28 along wire 28', through magnet-coils 6'', 5'', 4'', 3'', 2'', and 1'', along wire 29' to contact 29, across brush 32, Fig. 4, to segment 26, along wire 26', through suitable resistance 30 to contact 19, across plate 20, to and along wire 41 to the opposite side of supply-line. This circuit energizes all magnets 1'', 2'', 3'', 4'', 5'', and 6'', which attract and hold their respective levers 1, 2, 3, 4, 5, and 6, as shown in Figs. 1 and 2, said levers being made of a magnetic metal. If lever 27 is thrown still farther around, it will also touch either contact H or I. Assuming that it is moved so as to engage contact I, then there is another circuit made as follows: from the contact I along the wire 13'', through coil 13' of the reversing-switch 43, along the wire 39 to the contacts 19, across each plate 20 to and along the wire 41 to the opposite side D of the line. When the coil 13' is energized, it lifts its core 13, supplying current to the shunt field-magnet F from the contact F' and switch 43 and closing the circuit through the armature E and its resistance $a$, $b$, $c$, $d$, $e$, and $f$ by the switch 43 to connect the contacts 44; but before the main motor-circuit can be closed all plates 20 must touch their contacts 19, giving the coil 13' its maximum current to lift its core and also insuring the starting of the motor with all its armature resistance in the circuit. The reason for this action is that when the resistance 40 is in the circuit of the magnets 13' or 14' said magnets are not strong enough to raise their cores, although strong enough to hold said cores raised if they have already been raised. When the magnet 13' lifts its core 13, the latter engages and pushes upward the rod 11 from the position shown in Fig. 2 to that shown in Fig. 3. When the rod 11 is pushed up, it carries with it by means of the pin 42 the lever 10. This operation causes the shaft 7 to be turned, and with it all the levers 8, as shown in Fig. 3. As heretofore explained, all the levers 1 2 3, &c., are now held down by the attraction of the magnets 1'' 2'' 3'', &c. Therefore when the levers 8 are raised by the turning of the shaft 7 all the springs 9 are stretched and placed under tension. When the rod 11 is pushed up, it also allows the lever 15 to fall, being retarded by the action of the dash-pot 16, Fig. 1. In falling the lever 15 first connects the contact 1' with the segment 26 through the brush 32, which short-circuits the magnet-coil 1'', (referring to Fig. 5.) The current coming through the coil 2'' instead of going through the coil 1'' now finds a path of less resistance along the wire 33 to the contact 1', across the brush 32 to the segment 26, along the wire 26', through the resistance 30, across the right-hand plate 20, along the wire 41, to the opposite side D of the line. When the coil 1'' is short-circuited, it is demagnetized and no longer attracts its armature. The lever 1, is now drawn by the tension of its spring 9 from the position shown in Fig. 2 to that shown in Fig. 3, where its plate 22 connects the contacts 23 and 24. This operation (referring to Fig. 5) short-circuits the first section $a$ of the armature resistance in the main motor-circuit. In the same manner the lever 2 is released as soon as the lever 15 has descended far enough to connect the contact 2' by means of the brush 32 with the segment 26. This short-circuits the coil 2'', which releases the lever 2 and short-circuits the section $b$ of the armature-resistance, and so on the lever 15 will continue to fall, releasing each lever 3, 4, 5, and 6 in succession by cutting its corresponding coil out of the circuit, so that when the coil 6'' is short-circuited there is only the resistance 30 in the circuit, as follows: from the contact 28 on the switch along the wire 38' to the contact 6', across the brush 32 to the segment 26, along the wire 26', through the resistance 30, across one plate 20, along the wire 41, to the opposite side D of the line. Now when the lever 6 is drawn up by its spring 9 it carries its plate 20 away from the contacts 19 and opens this circuit. Likewise when the lever 1 is released it opens the circuit for the coil 13' at this point. The current for this coil now flows through the resistance 40 to the opposite side of the line. These circuits remain open until it is desired to stop the motor, which is done by throwing the switch-lever 27 to the off position. This opens the circuit through the coil 13', which drops its core 13, opening the main motor-circuits at the contacts F and 44. When the core 13 of the reversing-switch 43 drops, it allows the rod 11 and the levers 8 and 10 to assume their normal positions, and the levers 1, 2, 3, 4, 5, and 6 are also turned on the shaft 7 by gravity, taking the normal position, Fig. 2, carrying the plates 22 away from the contacts 23 and 24. When the rod 11 falls, it also returns the lever 15 to its normal position. (Shown in Fig. 1.) The apparatus is now ready to be started again by the lifting of either the solenoid-core 13' or 14'. As will be seen from Figs. 1 and 5, if the core of the switch 43' should be lifted it would send a current through the armature in the reverse direction of the switch 43. At the same time it also turns the shaft 7 by means of the rod 12 and the lever 10, which operation also lifts the rod 11, allowing the lever 15 to fall, short-circuiting the coils 1'' 2'' 3'', &c., and performing the same functions as previously explained in connection with the lifting of the core 13.

The object of the magnet 17 is to hold the lever 15, which is made of a magnetic metal, in any position the operator chooses, and consequently giving various speeds to the armature, depending upon the amount of resistance $a$, $b$, $c$, $d$, $e$, and $f$ left in the circuit. Its coil receives a current in the following manner: By moving the lever 27 of the switch far enough it will cover three contacts 28, H, and 17'. From the contact 17' a current flows along the wire 17'', through the coil 17, along the wire 18, to the opposite side of the line. Thus the descent of the lever 15 will be checked as long as the lever 27 of the switch touches either contact 17'.

By "cut-out" or "short-circuiting" device I mean substantially the same thing, as they both secure the same result practically.

I claim as my invention—

1. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, and electric devices, for successively excluding said magnets.

2. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs.

3. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, and a shaft supporting said arms.

4. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, and apparatus for rocking said shaft.

5. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, and an arm from the shaft pivoted to said rod.

6. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, and an electromagnetic device for controlling said rod.

7. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, and an electromagnetic device for controlling said rod, and whose current is controlled by said manual switch.

8. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, an electromagnetic device for controlling said rod, and whose current is controlled by said manual switch, a second electromagnetic device for operating said shaft, and reversing-switches for said motor controlled by said electromagnetic devices respectively.

9. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, an electromagnetic device for controlling said rod, a dash-pot, a piston therein and connected up with the said electric devices which cut out said magnets for releasing the said resistance cut-outs, said piston being connected up with said rod to be released by the latter.

10. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, and a dash-pot for regulating the action of said electric devices.

11. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, and electric devices, for successively excluding said magnets, said devices consisting of electromagnetic apparatus, whose current is controlled by said manual circuit-closer.

12. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said means consisting of electromagnetic apparatus, whose current is controlled by said manual circuit-closer, a second electromagnetic apparatus similarly controlled and having a similar function, and switches actuated by said apparatus for reversing the current of said motor.

13. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, and a shaft supporting said arms, said levers having holes and the said arms passing through said holes.

14. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, a shaft supporting said arms, apparatus for rocking said shaft, said apparatus consisting of a rod, an arm from the shaft pivoted to said rod, a solenoid, and a core therefor in whose path said rod is located.

15. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, said rod having a slot therein, a lever forming a part of said electric devices and passing through said slot so as to be held from turning by said rod, and a dash-pot connected up with the last-named lever for retarding the rate of cutting out of said magnets.

16. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, said rod having a slot therein, a lever forming a part of said electric devices and passing through said slot so as to be held from turning by said rod, a dash-pot connected up with the last-named lever for retarding the rate of cutting out of said magnets, and a magnet for stopping the last lever, whose current is controlled by said manual circuit-closer.

17. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said devices consisting of a row of contact-terminals for said magnets and apparatus for successively short-circuiting and then opening the circuits of said magnets.

18. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, and a shaft supporting said arms, said devices consisting of a row of contact-terminals for said magnets and apparatus for successively short-circuiting and then opening the circuits of said magnets.

19. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, a shaft supporting said arms, and apparatus for rocking said shaft, said devices consisting of a row of contact-terminals for said magnets and apparatus for successively short-circuiting and then opening the circuits of said magnets.

20. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, a shaft supporting said arms, apparatus for rocking said shaft, said apparatus consisting of a rod, and an arm from the shaft pivoted to said rod, said devices consisting of a row of contact-terminals for said magnets and apparatus for successively short-circuiting and then opening the circuits of said magnets.

21. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said devices consisting of a row of contact-terminals for said magnets and apparatus for successively short-circuiting and then opening the circuits of said magnets and a magnet for stopping said devices at any desired point.

22. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, said devices consisting of a row of contact-terminals for said magnets and apparatus for successively short-circuiting and then opening the circuits of said magnets, and a magnet for stopping said devices at any desired point.

23. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, a shaft supporting said arms, apparatus for rocking said shaft, said apparatus consisting of a rod, an arm from the shaft pivoted to said rod, said devices consisting of a row of contact-terminals for said magnets and apparatus for successively short-circuiting and then opening the circuits of said magnets, and a magnet for stopping said devices at any desired point.

24. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said devices consisting of a row of contact-terminals for said magnets and apparatus for successively short-circuiting and then opening the circuits of said magnets, and a magnet for stopping said devices at any desired point, and whose current is controlled by said manual switch.

25. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, and an arm from the shaft pivoted to said rod, said devices being released by the action of said rod.

26. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, a shaft supporting said arms, apparatus for rocking said shaft, said apparatus consisting of a rod, an arm from the shaft pivoted to said rod, and an electromagnetic device for controlling said rod, said devices being released by the action of said rod.

27. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, a shaft supporting said arms, apparatus for rocking said shaft, said apparatus consisting of a rod, an arm from the shaft pivoted to said rod, and an electromagnetic device for controlling said rod, and whose current is controlled by said manual switch, said devices being released by the action of said rod.

28. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, a shaft supporting said arms, apparatus for rocking said shaft, said apparatus consisting of a rod, an arm from the shaft pivoted to said rod, said devices being released by the action of said rod, and a dash-pot for regulating the movement of said devices.

29. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, a shaft supporting said arms, apparatus for rocking said shaft, said apparatus consisting of a rod, an arm from the shaft pivoted to said rod, an electromagnetic device for controlling said rod, said devices being released by the action of said rod, and a dash-pot for regulating the movement of said devices.

30. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, a shaft supporting said arms, apparatus for rocking said shaft, said apparatus consisting of a rod, an arm from the shaft pivoted to said rod, an electromagnetic device for controlling said rod, and whose current is controlled by said manual switch, said devices being released by the action of said rod, and a dash-pot for regulating the movement of said devices.

31. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, a shaft supporting said arms, apparatus for rocking said shaft, said apparatus consisting of a rod, an arm from the shaft pivoted to said rod, said devices being released by the action of said rod, and means for regulating the speed of movement of said devices.

32. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, an electromagnetic device for controlling said rod, said devices being released by the action of said rod, and means for regulating the speed of movement of said devices.

33. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, and means for regulating the speed of movement of said devices.

34. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, said devices being released by the action of said rod, and a magnet, whose current is controlled by said manual switch, for stopping said devices at predetermined phases.

35. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, said devices being released by the action of said rod, a dash-pot for regulating the movement of said devices, and a magnet, whose current is controlled by said manual switch, for stopping said devices at predetermined phases.

36. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms, and springs, said springs connecting said arms to said cut-outs, a shaft supporting said arms, apparatus for rocking said shaft, said apparatus consisting of a rod, an arm from the shaft pivoted to said rod, said devices being released by the action of said rod, means for regulating the speed of movement of said devices, and a magnet, whose current is controlled by said manual switch, for stopping said devices at predetermined phases.

37. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, and series circuit-closers carried respectively by said cut-outs and all of which must be closed before the main motor-circuit can be closed.

38. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, an electromagnetic device for controlling said rod, and series circuit-closers carried respectively by said cut-outs and all of which must be closed before the main motor-circuit can be closed.

39. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, an electromagnetic device for controlling said rod, and whose current is controlled by said manual switch, and series circuit-closers carried respectively by said cut-outs and all of which must be closed before the main motor-circuit can be closed.

40. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, said levers having holes and the said arms passing through said holes, and series circuit-closers carried respectively by said cut-outs and all of which must be closed before the main motor-circuit can be closed.

41. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said means consisting of electromagnetic apparatus, whose current is controlled by said manual circuit-closer, a second electromagnetic apparatus similarly controlled and having a similar function, switches actuated by said apparatus for reversing the current of said motor, and series circuit-closers carried respectively by said cut-outs and all of which must be closed before the main motor-circuit can be closed.

42. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said devices consisting of a row of contact-terminals for said magnets and a circuit-opener for successively opening the circuits of said magnets, a magnet for stopping said devices at any predetermined phase, and series circuit-closers carried respectively by said cut-outs and all of which must be closed before the main motor-circuit can be closed.

43. In an automatic electric-motor starter, the combination of an electric motor, resistances in series circuit therewith, a manual switch, cut-outs for the resistances, magnets for holding the cut-outs open, and whose current is controlled by said manual switch, means less powerful than the magnets tending to close the cut-outs, electric devices, for successively excluding said magnets, said cut-outs consisting of levers, and said means consisting of arms and springs, said springs connecting said arms to said cut-outs, a shaft supporting said arms, apparatus for rocking said shaft, said apparatus consisting of a rod, an arm from the shaft pivoted to said rod, an electromagnetic device for controlling said rod, said devices being released by the action of said rod, and series circuit-closers carried respectively by said cut-outs and all of which must be closed before the main motor-circuit can be closed.

44. In an automatic electric-motor starter, the combination of a motor, resistances in series therewith, devices, for successively cutting out said resistances, a manual switch for the current for actuating said devices, and means controlled by the current from said switch for stopping the cutting out of said resistances at any predetermined stage.

45. In an automatic electric-motor starter, the combination of a shaft, arms extending therefrom, rods pivoted to said arms, levers carrying cut-outs, resistances for which said cut-outs are provided, other arms from the shaft, springs connecting the last arms to the said levers, magnets, armatures on said levers and held by said magnets, the levers having holes through which pass said last arms, magnets 13' for operating said rods, an electric motor, reversing-switches for the motor governed by said magnets 13', circuit-closers for successively cutting out the first magnets, the rods having slots, the circuit-closers extending through said slots to hold the circuit-closers open by the action of said rods and to allow them to close when said rods rise, dash-pots resisting the turning of said circuit-closers, a magnet 17 for stopping the circuit-closers at different points, and a manual switch for governing the currents which actuated the above-named magnet.

In testimony whereof I have hereunto subscribed my name this 18th day of July, 1904.

WILLIAM MICHAEL CUMMISKEY. [L. S.]

Witnesses:
   JOSEPH A. FANNING,
   FRANK J. DENNER.